United States Patent
Yamamoto

[11] Patent Number: 5,946,144
[45] Date of Patent: Aug. 31, 1999

[54] WIDE-ANGLE LENS

[75] Inventor: Chikara Yamamoto, Omiya, Japan

[73] Assignee: Fuji Photo Optical Co., Ltd., Saitama, Japan

[21] Appl. No.: 09/168,074

[22] Filed: Oct. 8, 1998

[30] Foreign Application Priority Data

Oct. 29, 1997 [JP] Japan .................................. 9-312715
Sep. 28, 1998 [JP] Japan .................................. 10-272974

[51] Int. Cl.⁶ .................................................. G02B 3/08
[52] U.S. Cl. ...................... 359/742; 359/663; 359/689; 359/784; 359/749
[58] Field of Search .................................. 359/749–753, 359/399, 422, 648–651, 663, 676, 683, 689, 708, 716, 784, 742, 785, 786

[56] References Cited

U.S. PATENT DOCUMENTS

| | | | |
|---|---|---|---|
| 4,936,657 | 6/1990 | Tejima et al. | 350/331 R |
| 5,600,488 | 2/1997 | Minefuji et al. | 359/651 |
| 5,812,326 | 9/1998 | Tamada | 359/749 |

FOREIGN PATENT DOCUMENTS 8-320433  12/1996  Japan .............................. G02B 13/16

Primary Examiner—Georgia Epps
Assistant Examiner—David N. Spector
Attorney, Agent, or Firm—Snider & Chao, LLP; Ronald R. Snider

[57] ABSTRACT

A wide-angle lens has a three-group configuration in which a plastic aspherical lens is used in the first lens group on the enlargement side, and predetermined conditional expressions concerning focal lengths of individual lenses constituting the first lens group are satisfied, whereby image quality is restrained from deteriorating due to changes in temperature, and a telecentric characteristic is attained such that no vignetting occurs in marginal luminous fluxes, thus making various kinds of aberration favorable and allowing the cost to be cut down. The first lens group $G_1$ disposed on the enlargement side has a three-lens configuration in which the first lens $L_1$ on the enlargement side and the third lens $L_3$ on the reduction side are constituted by a plastic aspherical lens having a negative refracting power and a plastic aspherical lens having a positive refracting power, respectively. Letting the focal length of the first lens group $G_1$ be $F_1$, the focal length of the whole lens system be F, the focal length of the first lens $L_1$ be $f_A$, and the focal length of the third lens $L_3$ be $f_B$, the conditional expression (1) of $-7.5<F_1/F<-3.0$ and the conditional expression (2) of $-1.8<f_A/f_B<-0.5$ are satisfied.

3 Claims, 10 Drawing Sheets

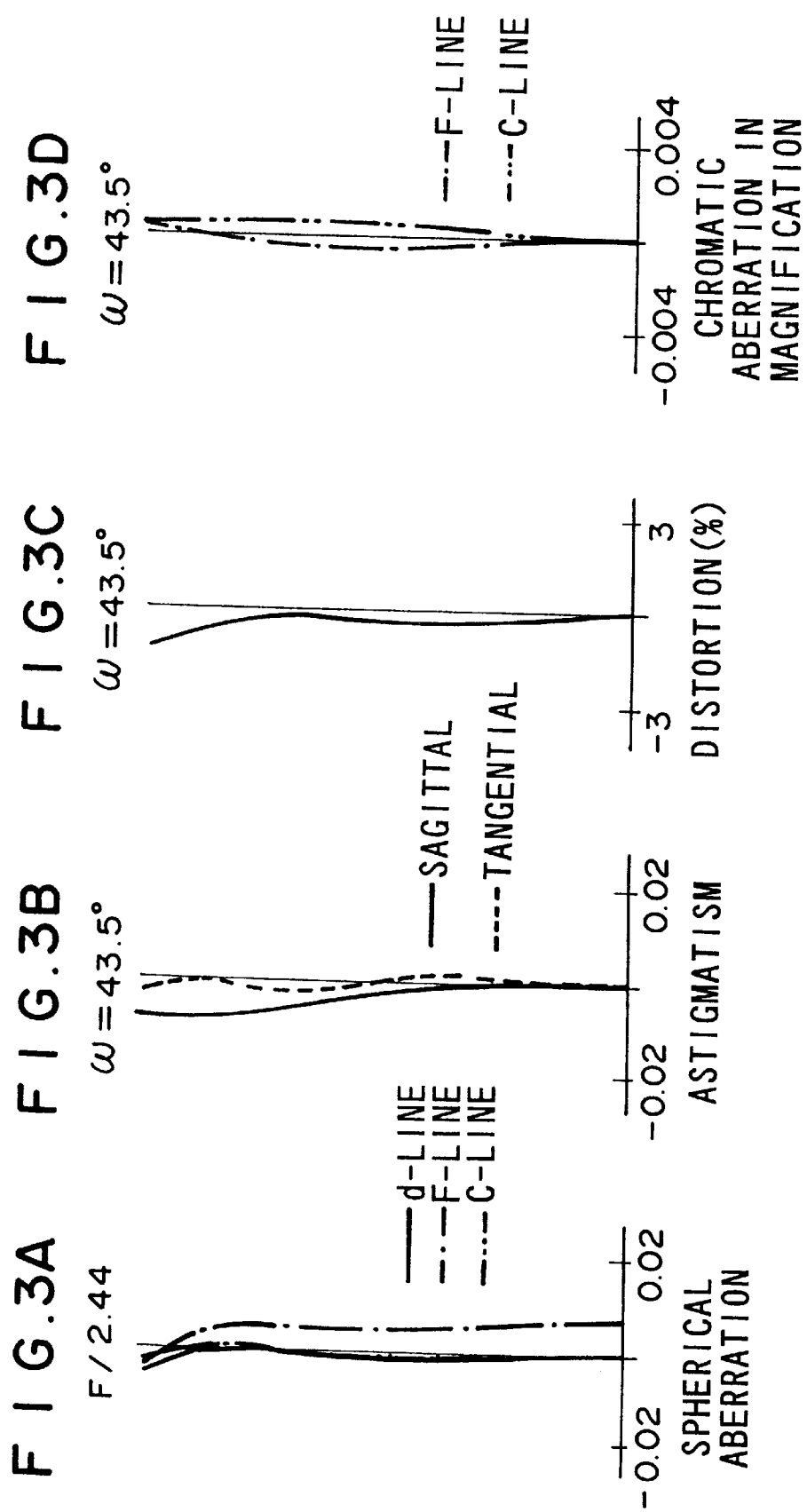

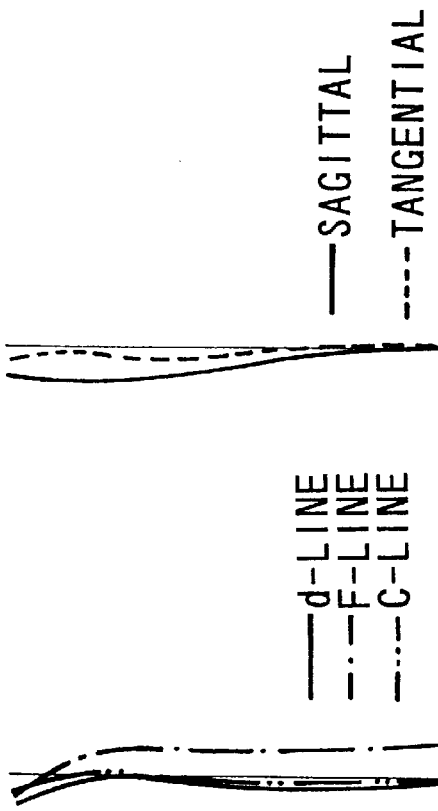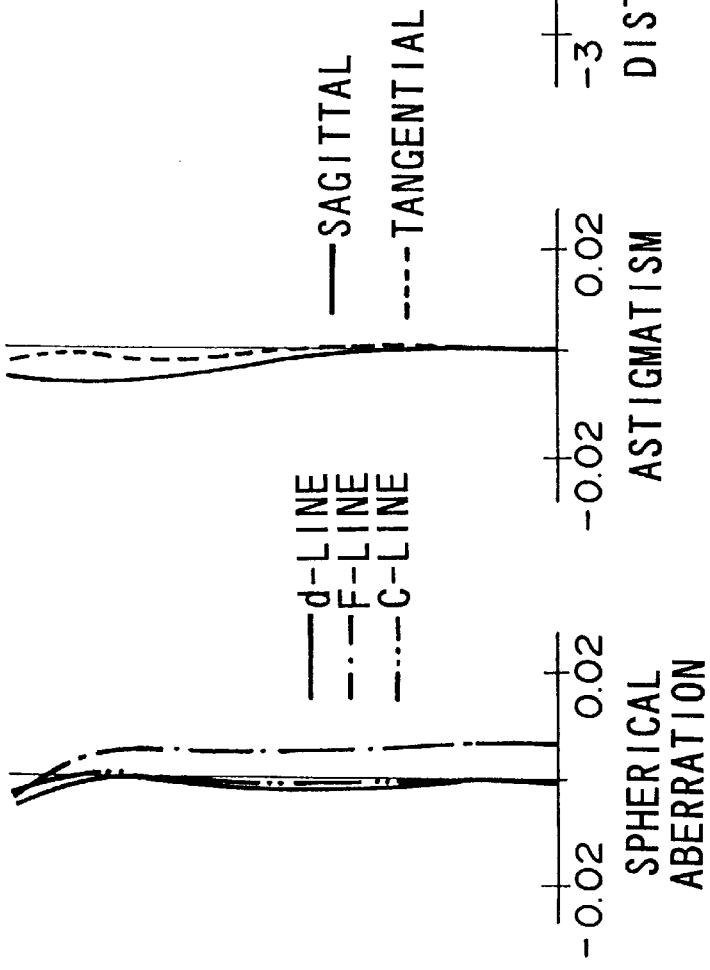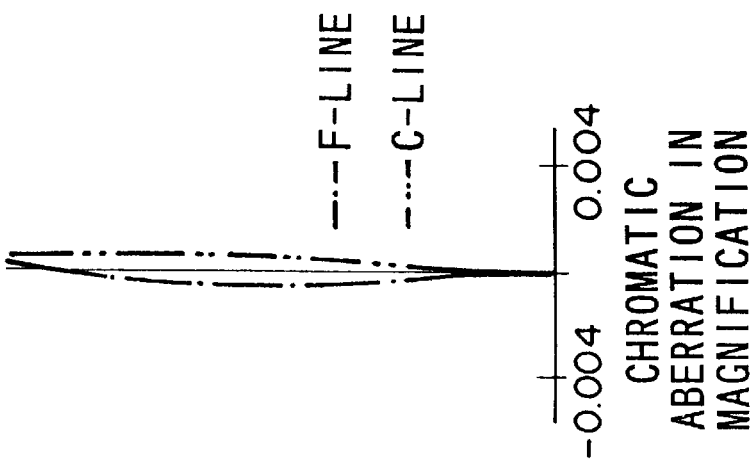

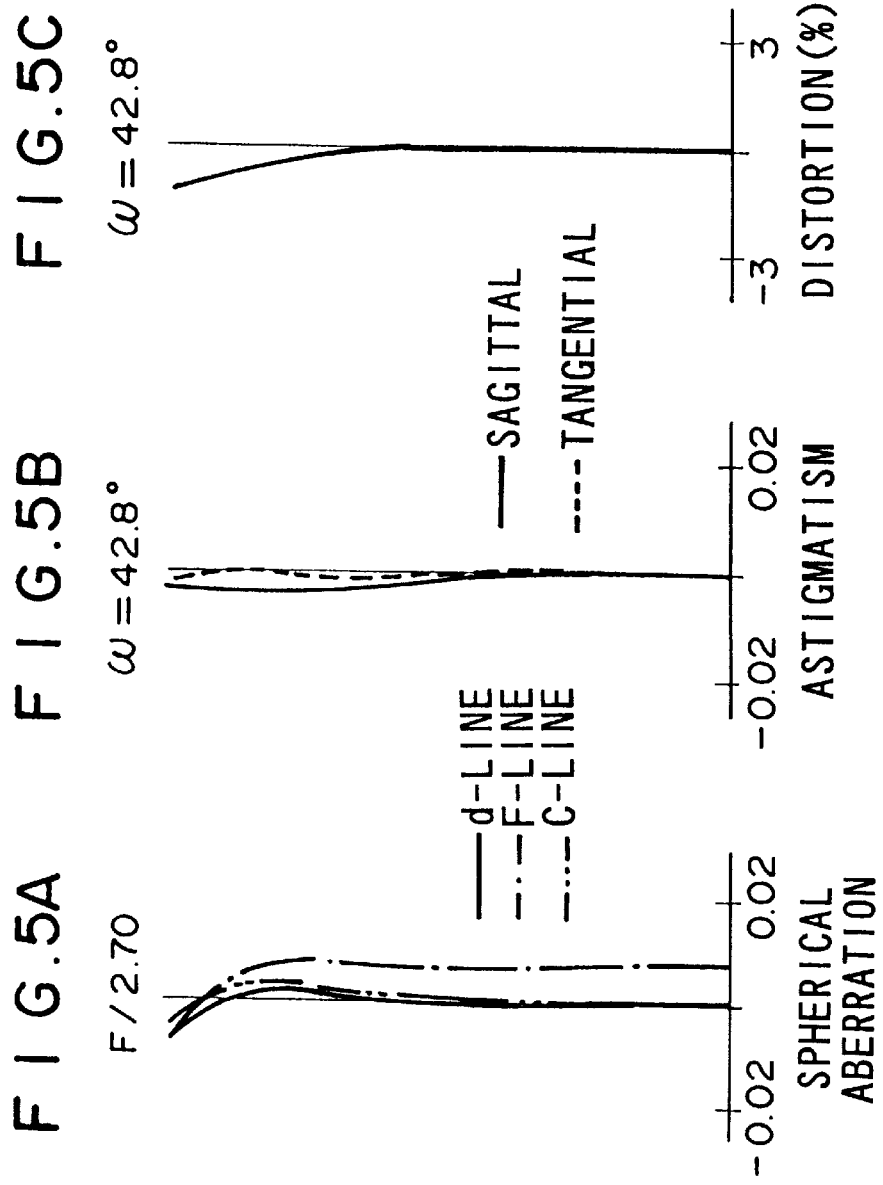

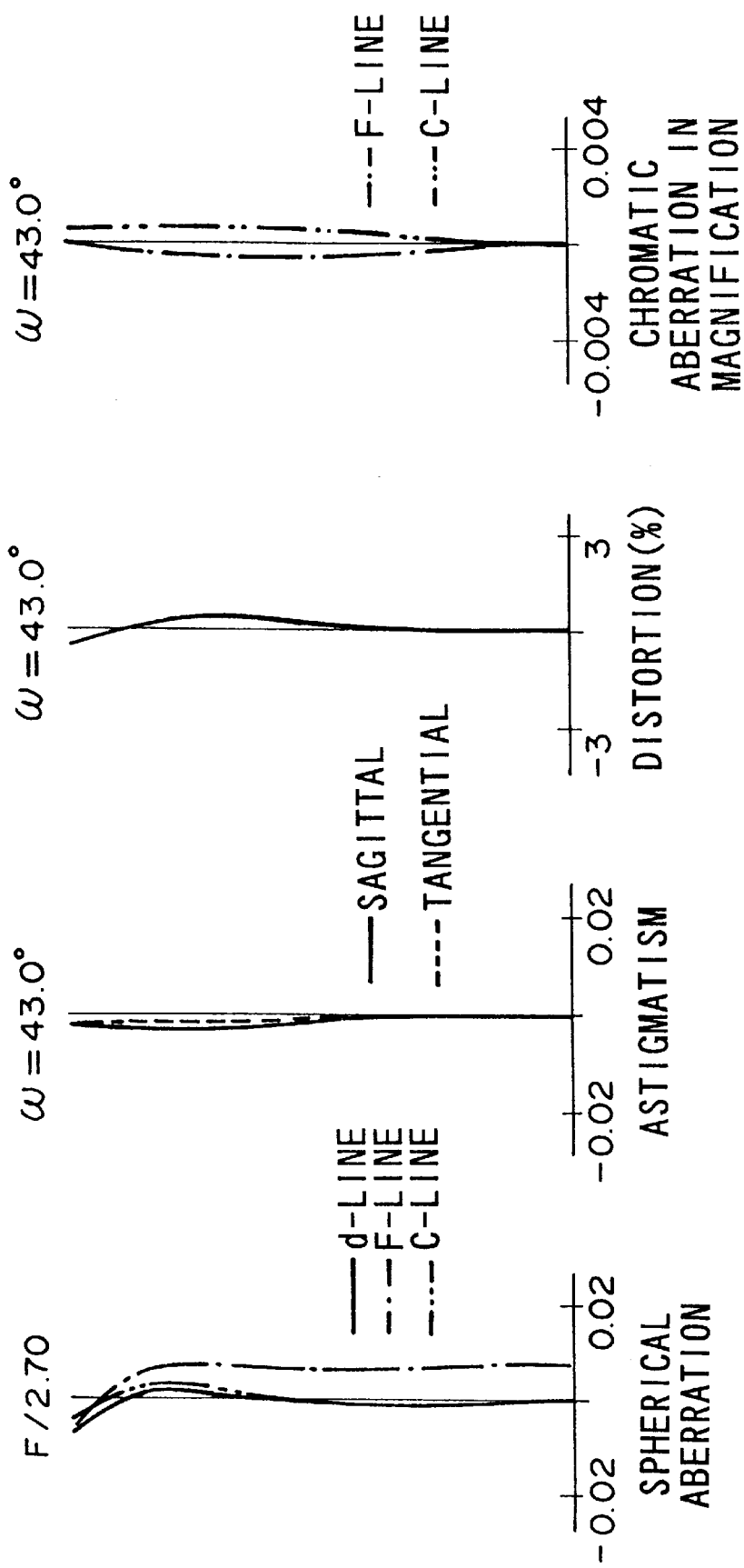

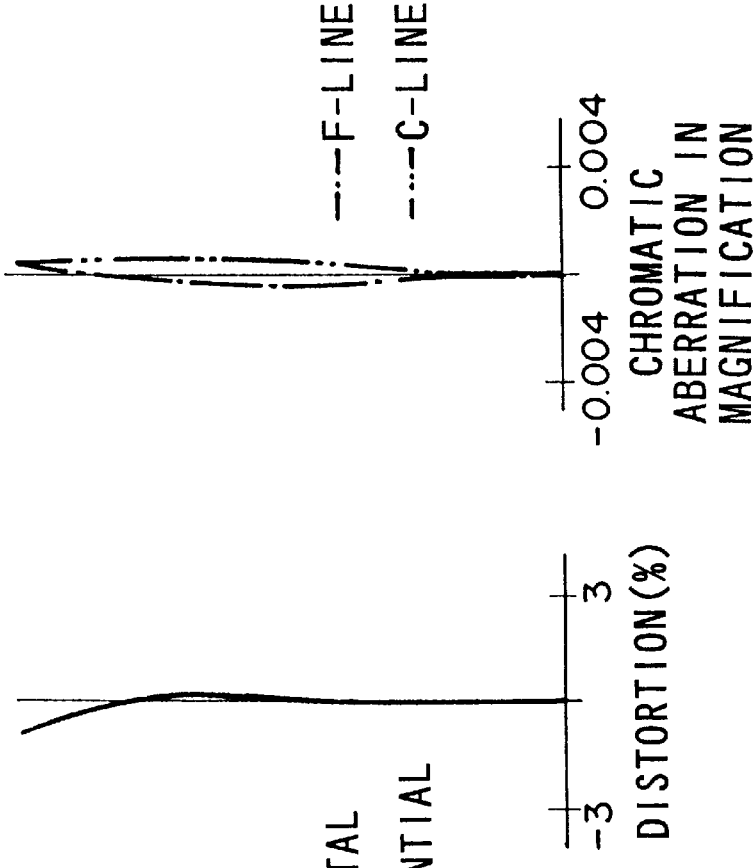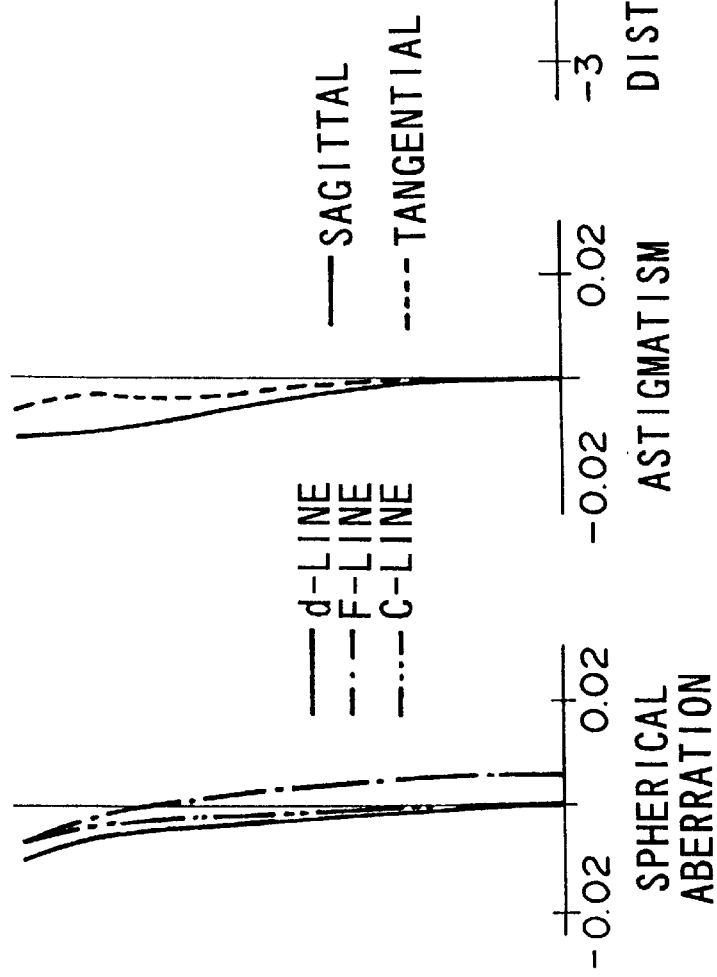

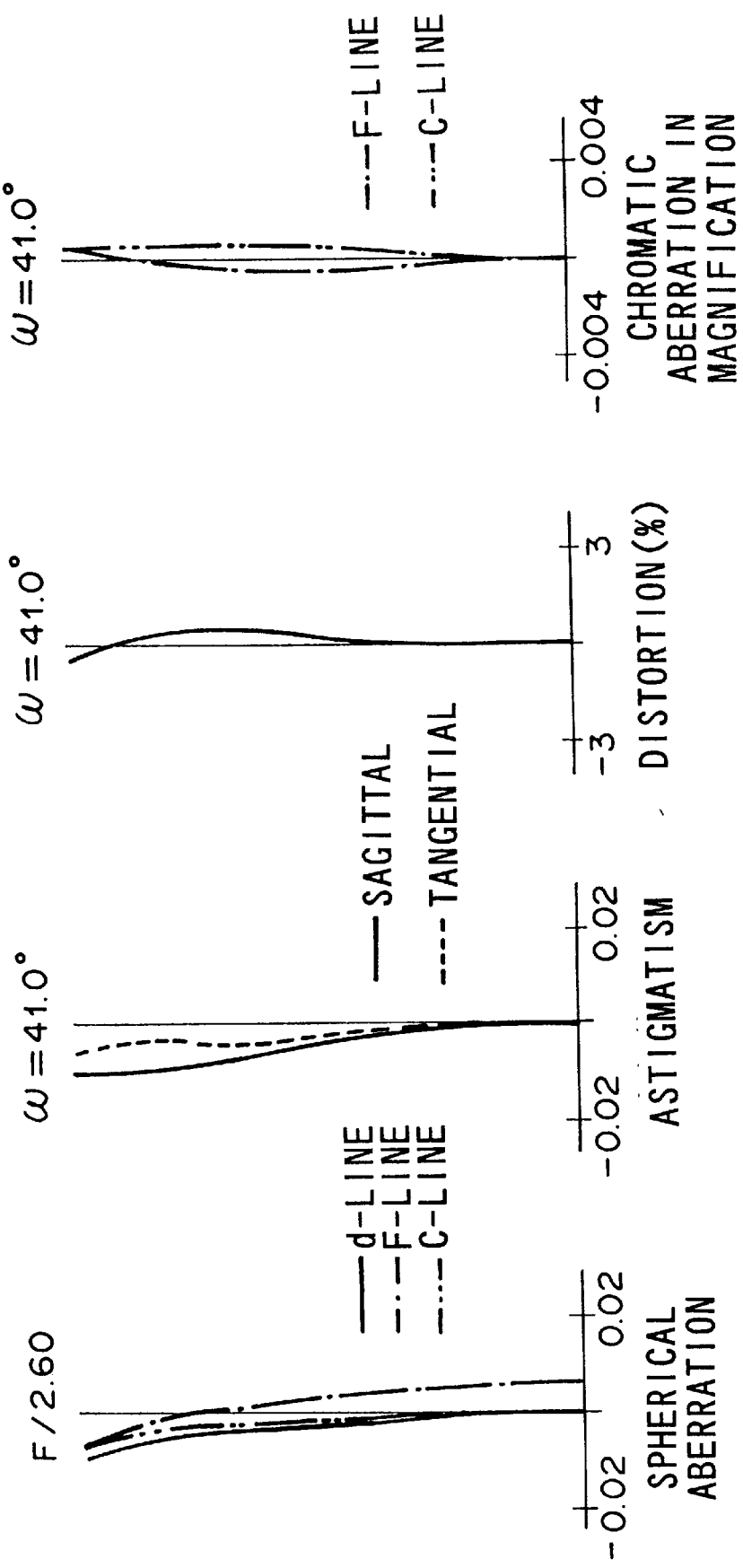

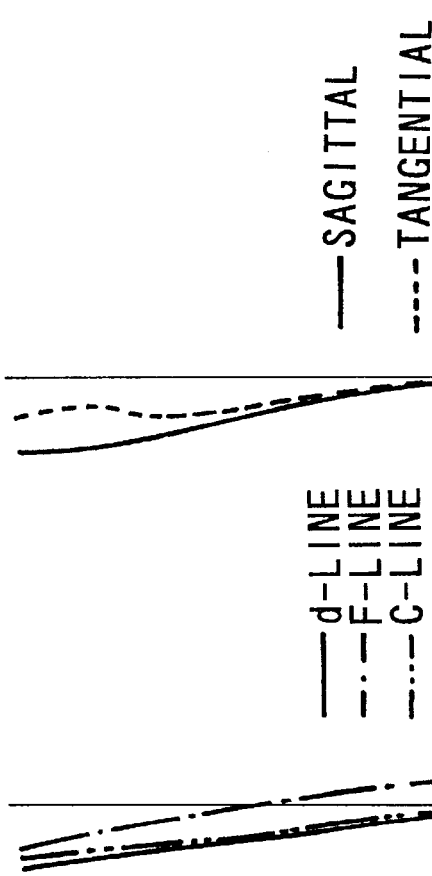

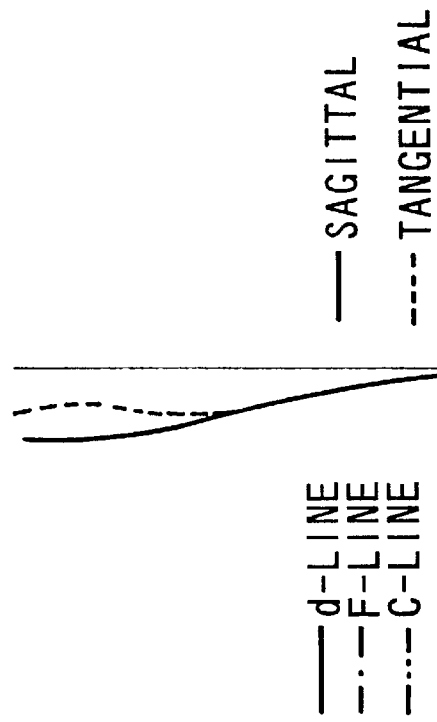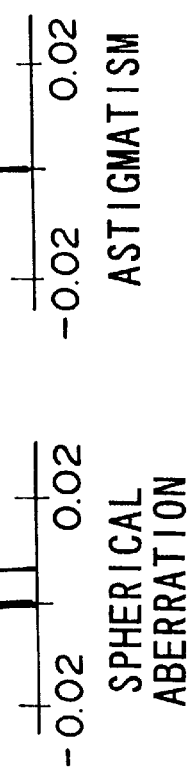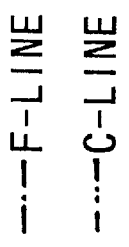

WIDE-ANGLE LENS

RELATED APPLICATIONS

This application claims the priority of Japanese Patent Application No. 9-312715 filed on Oct. 29, 1997 and No. 10-272974 filed on Sep. 28,1998, which are incorporated herein by reference.

BACKGROUND OF THE INVENTION

1. Field of the Invention

The present invention relates to a wide-angle lens which is used for an imaging lens in a camera employing an imaging device such as CCD or imaging tube, a film, or the like; and, more specifically, to a wide-angle lens used for a projection lens in a projection type TV employing a liquid-crystal panel.

2. Description of the Prior Art

Conventionally, wide-angle lenses have been used in projection lenses in projection type TVs in order to increase the size of their screens or reduce their depth. Such a wide-angle lens has been required to secure a long back focus for inserting a mirror or the like in the middle of its optical path. There has hence been employed a lens configuration comprising a front group having a negative refracting power and a rear group having a positive refracting power.

In the above-mentioned wide-angle lens, since its distortion becomes large, it is necessary to use an aspherical lens on its enlargement side so as to correct the distortion. In this case, since aspherical lenses made of glass are expensive, those made of plastic may be employed for cutting down the cost.

In particular, since the enlargement-side lens of the wide-angle lens generally becomes greater in size, an aspherical lens made of glass having a refracting power would increase its cost considerably. Therefore, the use of a plastic lens is effective in terms of cost.

On the other hand, aspherical lenses made of plastic are disadvantageous in that they are less resistant to temperature changes, whereby their focal positions may change or their imaging performances may deteriorate due to temperature changes. Consequently, when using aspherical lenses made of plastic, they are often designed such that their refracting power is not so high.

In order to solve such a problem, Japanese Unexamined Patent Publication No. 8-320433 discloses a technique in which an aspheric lens made of plastic is used for a wide-angle lens.

When a wider-angle lens is to be produced by means of the above-mentioned technique using an aspheric lens made of plastic, its focal length becomes shorter, thereby shortening the space into which a returning mirror, a color-combining optical part, or the like is inserted. Also, when a glass lens is inserted into the first lens group on the enlargement side in order to secure a back focus space, thereby reducing the power of the aspherical lens made of plastic, the ratio of refracting power of the glass lens becomes higher in the first lens group, whereby the glass lens may enhance its size so as to increase the cost.

SUMMARY OF THE INVENTION

In view of such circumstances, it is an object of the present invention to provide a wide-angle lens in which an aspherical lens made of plastic having a negative refracting power is used on its enlargement side, so as to correct various kinds of aberration such as distortion, suppress changes in focal position and deterioration in imaging performances due to changes in temperature, and make the glass lens smaller, whereby its cost can be cut down.

It is another object of the present invention to provide a wide-angle lens in which its reduction side is telecentric with no vignetting in its marginal luminous flux, a space for inserting a returning mirror, a color-combining optical part, or the like is secured, and its image quality is less likely to deteriorate when magnification is changed.

The wide-angle lens in accordance with the present invention comprises, successively from an enlargement side, a first lens group having a negative refracting power, a second lens group having a positive refracting power, and a third lens group having a positive refracting power made of a Fresnel lens;

wherein the first lens group comprises, successively from the enlargement side, a first lens made of a plastic aspherical lens having a negative refracting power with a concave face directed onto a reduction side, a second lens having a negative refracting power with a concave face directed onto the reduction side, and a third lens made of a plastic aspherical lens having a positive refracting power; and wherein the following conditional expressions (1) and (2) are satisfied:

$$-7.5<F_1/F<-3.0 \quad (1)$$

$$-1.8<f_A/f_B<-0.5 \quad (2)$$

where $F_1$ is the focal length of the first lens group;

F is the focal length of the whole lens system;

$f_A$ is the focal length of the first lens in the first lens group; and $f_B$ is the focal length of the third lens in the first lens group.

In the second lens group, a plastic aspherical lens may be disposed closest to the enlargement side, so as to satisfy the following conditional expression (3):

$$|F/f_C|<0.2 \quad (3)$$

where $f_C$ is the focal length of the plastic aspherical lens closest to the enlargement side in the second lens group.

Further, when changing magnification, focusing may be carried out such that, while the Fresnel lens in the third lens group is fixed, the distance between the first and second lens groups and the distance between the second and third lens groups are changed.

Due to the configurations mentioned above, the present invention can yield the results explained in the following.

First, in the first lens group, since the first lens on the enlargement side is a plastic aspherical lens, a glass lens on the enlargement side can have a lower ratio of refracting power distribution, whereby the size of the glass lens can be reduced, which, together with the use of the aspherical lenses made of plastic, can cut down the cost.

Also, since the third lens is constituted by a Fresnel lens having a positive refracting power, the reduction side becomes telecentric with no vignetting in marginal luminous fluxes. Further, since this Fresnel lens is made aspherical, distortion and curvature of field can easily be corrected.

When the conditional expression (1) is satisfied, a compact lens system can be obtained while an inserting space for a returning mirror, a color-combining optical part, or the like is secured, and imaging performances can be restrained from deteriorating due to changes in temperature.

Namely, when the refracting power of the first lens group becomes so strong as to exceed the upper limit of the conditional expression (1), the distance between the second and third lens groups becomes so wide that the lens system cannot be made compact. Also, the power distribution of the plastic aspherical lenses in the first lens group may become out of balance, whereby imaging performances would deteriorate greatly due to changes in temperature. When the refracting power of the first lens group is too weak to reach the lower limit of the conditional expression (1), by contrast, the distance between the second and third lens groups would be so narrow that there is no space for inserting a returning mirror, a color-combining optical part, and the like.

When the conditional expression (2) or (3) is satisfied, imaging performances can be restrained from deteriorating due to changes in temperature.

Namely, outside the upper and lower limits of the conditional expression (2) or (3), the power distribution of the plastic aspherical lenses in the first lens group may become out of balance, thus enhancing the deterioration in imaging performances due to changes in temperature.

Further, in the case where focusing is effected such that, when magnification is changed, with the third lens being fixed, the first and second lens groups are moved while adjusting the distance between the first and second lens groups and the distance between the second and third lens groups, the marginal imaging face can be corrected in a well-balanced fashion.

When a plastic aspherical lens is inserted into the second lens group such as to be placed closest to the enlargement side, the aberration-correcting capacity of the aspherical lenses can be made more efficient.

BRIEF DESCRIPTION OF THE DRAWINGS

FIGS. 3A to 3D are aberration charts of the wide-angle lens in accordance with Example 1 of the present invention (at a lower magnification);

FIGS. 4A to 4D are aberration charts of the wide-angle lens in accordance with Example 1 of the present invention (at a higher magnification);

FIGS. 5A to 5D are an aberration charts of the wide-angle lens in accordance with Example 2 of the present invention (at a lower magnification);

FIGS. 6A to 6D are aberration charts of the wide-angle lens in accordance with Example 2 of the present invention (at a higher magnification);

FIGS. 7A to 7D are aberration charts of the wide-angle lens in accordance with Example 3 of the present invention (at a lower magnification);

FIGS. 8A to 8D are aberration charts of the wide-angle lens in accordance with Example 3 of the present invention (at a higher magnification);

FIGS. 9A to 9D are aberration charts of the wide-angle lens in accordance with Example 4 of the present invention (at a lower magnification); and FIGS. 10A to 10D are aberration charts of the wide-angle lens in accordance with Example 4 of the present invention (at a higher magnification).

DESCRIPTION OF THE PREFERRED EMBODIMENTS

In the following, embodiments of the present invention will be explained with reference to the accompanying drawings.

The wide-angle lens in accordance with the present invention is used, for example, in a projection lens of a projection type TV employing a liquid crystal panel.

This wide-angle lens will be explained in detail.

Figure 1:
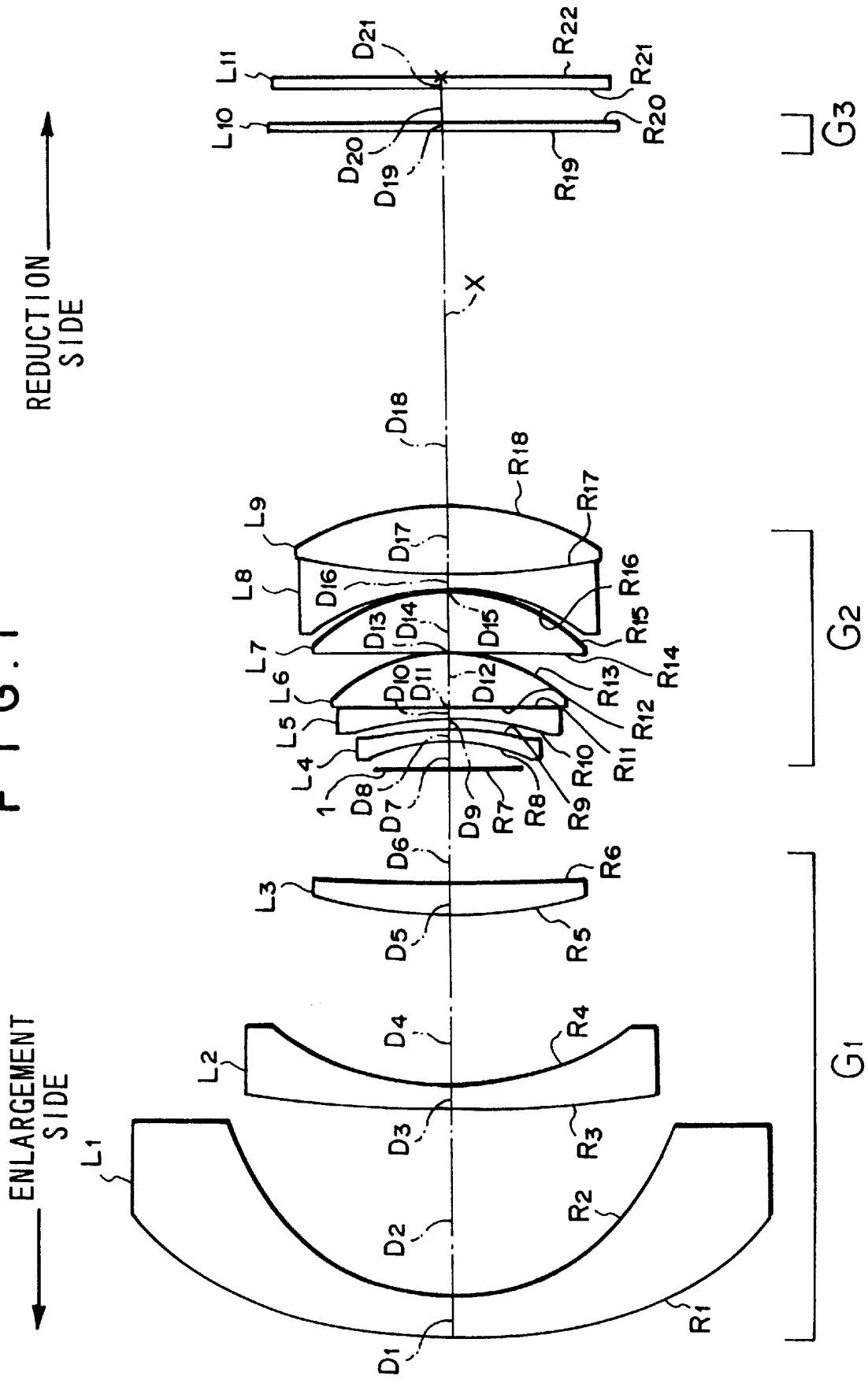
FIG. 1 is a sectional view showing a wide-angle lens in accordance with Examples 1 and 2.

FIG. 1 is a sectional view of a lens system showing the wide-angle lens in accordance with Examples 1 and 2 of the present invention.

Namely, the lens system in accordance with Examples 1 and 2 comprises, successively from the enlargement side, a first lens group $G_1$ having a negative refracting power, a second lens group $G_2$ having a positive refracting power, and a third lens group $G_3$ made of a Fresnel lens $L_{10}$ having a positive refracting power; whereas a cover glass $L_{11}$ for the liquid crystal panel is disposed on the reduction side of the Fresnel lens $L_{10}$.

The first lens group $G_1$ comprises, successively from the enlargement side, a negative plastic aspherical lens $L_1$ having a concave face directed onto the reduction side (toward the liquid crystal panel), a negative meniscus lens $L_2$ having a concave face directed onto the reduction side, and a positive plastic aspherical lens $L_3$ having a concave face directed onto the reduction side.

The second lens group $G_2$ comprises, successively from the enlargement side, a negative aspherical lens $L_4$ having a convex face directed onto the reduction side, a negative meniscus lens $L_5$ having a convex face directed onto the reduction side, a positive meniscus lens $L_6$ having a convex face directed onto the reduction side, a positive meniscus lens $L_7$ having a convex face directed onto the reduction side, a biconcave lens $L_8$, and a biconvex lens $L_9$. Here, the biconcave lens $L_8$ and the biconvex lens $L_9$ constitute a cemented lens.

Also, a stop 1 is disposed between the third lens $L_3$ in the first lens group $G_1$ and the first lens $L_4$ in the second lens group $G_2$.

In FIG. 1 (and also in FIG. 2), X indicates the optical axis.

The following Table 1 shows the radius of curvature R of each lens face near the optical axis X, center thickness of each lens and air spacing between neighboring lenses D, and refractive index N and Abbe number ν in each lens at d-line in Example 1. In the specification, each data value is standardized at the focal length of the whole lens system.

In Table 1, the numbers referring to the letters R, D, N, and ν successively increase from the enlargement side.

Here, the distance $D_6$ between the first lens group $G_1$ and the second lens group $G_2$ and the distance $D_{18}$ between the second lens group $G_2$ and the third lens group $G_3$ are variable, such that $D_6$ and $D_{18}$ are 0.6815 and 2.2427, respectively, at a lower magnification (12×), and 0.7155 and 2.2196, respectively, at a higher magnification (15×).

Letting the focal length of the first lens group $G_1$ be $F_1$, and the focal length of the whole lens system be F, $|F_1/F|=-4.62$, thus satisfying the conditional expression (1) of $-7.5<|F_1/F|<-3.0$.

Letting the focal length of the first lens $L_1$ in the first lens group $G_1$ be $f_A$, and the focal length of the third lens $L_3$ in the first lens group $G_1$ be $f_B$, $f_A/f_B=-0.73$, thus satisfying the conditional expression (2) of $-1.8<f_A/f_B<-0.5$.

Letting the focal length of the lens $L_4$ closest to the enlargement side in the second lens group $G_2$ be $f_C$, $|F/f_C|=0.064$, thus satisfying the conditional expression (3) of $|F/f_C|<0.2$.

Also, both faces of the first lens $L_1$ and third lens $L_3$ in the first lens group $G_1$ and the first lens $L_4$ in the second lens group $G_2$ and the reduction-side face of the Fresnel lens $L_{10}$ are aspheric surfaces whose forms are represented by the aspheric expression:

Expression 1

$$Z = \frac{\frac{Y^2}{R}}{1+\sqrt{1-K\frac{Y^2}{R^2}}} + AY^4 + BY^6 + CY^8 + DY^{10}$$

which employs the values of coefficients K, A, B, C, and D shown in the following Table 2.

In the above aspheric expression, Y is the height from the optical axis X, Z is the amount of displacement in the optical axis direction from the surface apex at the height Y, R is the radius of curvature of the surface, and K is the eccentricity.

In the following, the wide-angle lens in accordance with Example 2 of the present invention will be explained.

As shown in FIG. 1, the lens system in accordance with Example 2 is configured substantially the same as the lens system in accordance with Example 1 mentioned above but differs therefrom in that each of the third lens $L_6$ and fourth lens $L_7$ in the second lens group $G_2$ is made of a biconvex lens.

The following Table 3 shows the radius of curvature R of each lens face near the optical axis X, center thickness of each lens and air spacing between neighboring lenses D, and refractive index N and Abbe number ν in each lens at d-line in Example 2.

In Table 3, the numbers referring to the letters R, D, N, and ν successively increase from the enlargement side.

Here, the distance $D_6$ between the first lens group $G_1$ and the second lens group $G_2$ and the distance $D_{18}$ between the second lens group $G_2$ and the third lens group $G_3$ are variable, such that $D_6$ and $D_{18}$ are 0.6884 and 2.4801, respectively, at a lower magnification (12×), and 0.7237 and 2.4514, respectively, at a higher magnification (15×).

Letting the focal length of the first lens group $G_1$ be $F_1$, and the focal length of the whole lens system be F, $|F_1/F|=-4.73$, thus satisfying the conditional expression (1) of $-7.5<|F_1/F|<-3.0$.

Letting the focal length of the first lens $L_1$ in the first lens group $G_1$ be $f_A$, and the focal length of the third lens $L_3$ in the first lens group $G_1$ be $f_B$, $f_A/f_B=-0.77$, thus satisfying the conditional expression (2) of $-1.8<f_A/f_B<-0.5$.

Letting the focal length of the lens $L_4$ closest to the enlargement side in the second lens group G2 be $f_C$, $|F/f_C|=0.065$, thus satisfying the conditional expression (3) of $|F/f_C|<0.2$. both faces of the first lens $L_1$ and third lens $L_3$ in the first lens group $G_1$ and the first lens $L_4$ in the second lens group $G_2$ and the reduction-side face of the Fresnel lens $L_{10}$ are aspheric surfaces whose forms are represented by the above-mentioned aspheric expression, employing the values of coefficients K, A, B, C, and D shown in the following Table 4.

The wide-angle lenses in accordance with Examples 3 and 4 of the present invention will be explained in the following.

Figure 2:
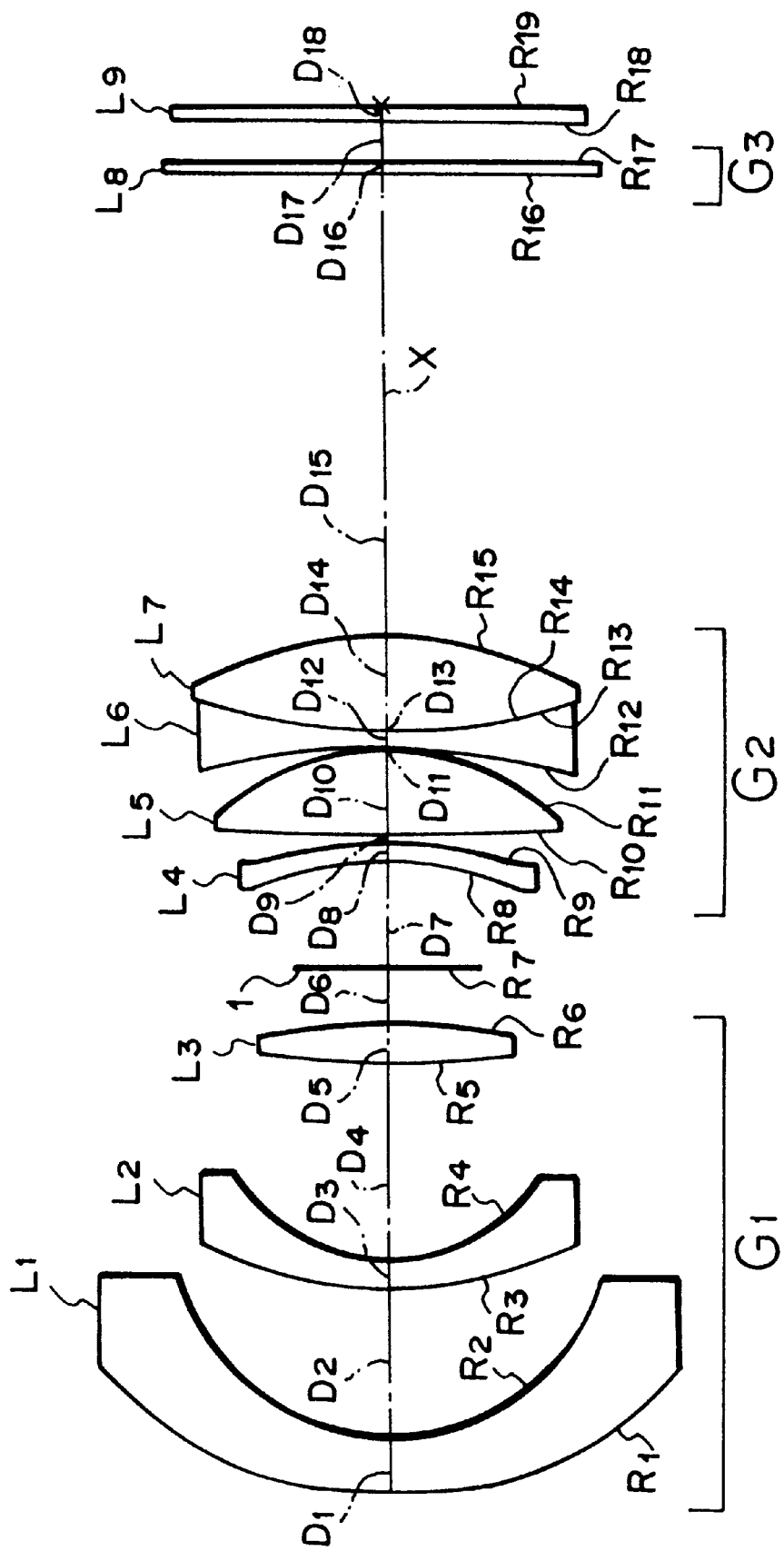
FIG. 2 is a sectional view showing a wide-angle lens in accordance with Examples 3 and 4.

FIG. 2 is a sectional view of a lens system showing the wide-angle lens in accordance with Examples 3 and 4 of the present invention.

Namely, the lens system in accordance with Examples 3 and 4 comprises, successively from the enlargement side, a first lens group $G_1$ having a negative refracting power, a second lens group $G_2$ having a positive refracting power, and a third lens group $G_3$ made of a Fresnel lens $L_8$ having a positive refracting power; whereas a cover glass $L_9$ for the liquid crystal panel is disposed on the reduction side of the Fresnel lens $L_8$.

The first lens group $G_1$ comprises, successively from the enlargement side, a negative plastic aspherical lens $L_1$ having a concave face directed onto the reduction side (toward the liquid crystal panel), a negative meniscus lens $L_2$ having a concave face directed onto the reduction side, and a biconvex plastic aspherical lens $L_3$.

The second lens group $G_2$ comprises, successively from the enlargement side, a negative aspherical lens $L_4$ having a convex face directed onto the reduction side, a biconvex lens $L_5$, a biconcave lens $L_6$, and a biconcave lens $L_7$.

Also, a stop 1 is disposed between the third lens $L_3$ in the first lens group $G_1$ and the first lens $L_4$ in the second lens group $G_2$.

The following Table 5 shows the radius of curvature R of each lens face near the optical axis X, center thickness of each lens and air spacing between neighboring lenses D, and refractive index N and Abbe number ν in each lens at d-line in Example 3.

In Table 5, the numbers referring to the letters R, D, N, and ν successively increase from the enlargement side.

Here, the distance $D_6$ between the first lens group $G_1$ and the second lens group $G_2$ and the distance $D_{15}$ between the second lens group $G_2$ and the third lens group $G_3$ are variable, such that $D_6$ and $D_{15}$ are 0.2347 and 2.0114, respectively, at a lower magnification (12×), and 0.2499 and 1.9796, respectively, at a higher magnification (15×).

Letting the focal length of the first lens group $G_1$ be $F_1$, and the focal length of the whole lens system be F, $|F_1/F|=-5.29$, thus satisfying the conditional expression (1) of $-7.5<|F_1/F|<-3.0$.

Letting the focal length of the first lens $L_1$ in the first lens group $G_1$ be $f_A$, and the focal length of the third lens $L_3$ in the first lens group $G_1$ be $f_B$, $f_A/f_B = -1.11$, thus satisfying the conditional expression (2) of $-1.8 < f_A/f_B < -0.5$.

Letting the focal length of the lens $L_4$ closest to the enlargement side in the second lens group $G_2$ be $f_C$, $|F/f_C| = 0.006$, thus satisfying the conditional expression (3) of $|F/f_C| < 0.2$.

Also, both faces of the first lens $L_1$ and third lens $L_3$ in the first lens group $G_1$ and the first lens $L_4$ in the second lens group $G_2$ and the reduction-side face of the Fresnel lens $L_8$ are aspheric surfaces whose forms are represented by the above-mentioned aspheric expression, employing the values of coefficients K, A, B, C, and D shown in the following Table 6.

The lens system in accordance with Example 4 will be explained in the following.

As shown in FIG. 2, the lens system in accordance with Example 4 is configured substantially the same as the lens system in accordance with Example 3 mentioned above.

The following Table 7 shows the radius of curvature R of each lens face near the optical axis X, center thickness of each lens and air spacing between neighboring lenses D, and refractive index N and Abbe number ν in each lens at d-line in Example 4.

In Table 7, the numbers referring to the letters R, D, N, and ν successively increase from the enlargement side.

Here, the distance $D_6$ between the first lens group $G_1$ and the second lens group $G_2$ and the distance $D_{15}$ between the second lens group $G_2$ and the third lens group $G_3$ are variable, such that $D_6$ and $D_{15}$ are 0.2070 and 1.8359, respectively, at a lower magnification (12×), and 0.2239 and 1.8171, respectively, at a higher magnification (15×).

Letting the focal length of the first lens group $G_1$ be $F_1$, and the focal length of the whole lens system be F, $|F_1/F| = -5.35$, thus satisfying the conditional expression (1) of $-7.5 < |F_1/F| < -3.0$.

Letting the focal length of the first lens $L_1$ in the first lens group $G_1$ be $f_A$, and the focal length of the third lens $L_3$ in the first lens group $G_1$ be $f_B$, $f_A/f_B = -1.07$, thus satisfying the conditional expression (2) of $-1.8 < f_A/f_B < -0.5$.

Letting the focal length of the lens $L_4$ closest to the enlargement side in the second lens group $G_2$ be $f_C$, $|F/f_C| = 0.029$, thus satisfying the conditional expression (3) of $|F/f_C| < 0.2$.

Also, both faces of the first lens $L_1$ and third lens $L_3$ in the first lens group $G_1$ and the first lens $L_4$ in the second lens group $G_2$ and the reduction-side face of the Fresnel lens $L_8$ are aspheric surfaces whose forms are represented by the above-mentioned aspheric expression, employing the values of coefficients K, A, B, C, and D shown in the following Table 8.

The aberration charts (showing spherical aberration, astigmatism, distortion, and chromatic aberration in magnification; which are also shown in the subsequent drawings) of Example 1 are represented by FIGS. 3A to 3D (at a lower magnification) and FIGS. 4A to 4D (at a higher magnification); the aberration charts of Example 2 are represented by FIGS. 5A to 5D (at a lower magnification) and FIGS. 6A to 6D (at a higher magnification); the aberration charts of Example 3 are represented by FIGS. 7A to 7D (at a lower magnification) and FIGS. 8A to 8D (at a higher magnification); and the aberration charts of Example 4 are represented by FIGS. 9A to 9D (at a lower and FIGS. 10A to 10D (at a higher magnification).

As can be seen from these aberration charts, the wide-angle lenses in accordance with the individual Examples mentioned above can make each kind of aberration favorable.

Without being restricted to the above-mentioned four Examples, the wide-angle lens in accordance with the present invention can be modified in various manners.

TABLE 1

| Face | R | D | $N_d$ | $\nu_d$ |
|---|---|---|---|---|
| 1 | 5.9423 | 0.2480 | 1.4902 | 57.8 |
| 2 | 1.3713 | 1.1393 | | |
| 3 | 8.7572 | 0.1344 | 1.5163 | 54.1 |
| 4 | 1.6803 | 1.0386 | | |
| 5 | 2.5970 | 0.1964 | 1.5836 | 30.3 |
| 6 | 21.2455 | Variable | | |
| 7 | ∞ | 0.1563 | | |
| 8 | −1.2598 | 0.0899 | 1.4910 | 57.6 |
| 9 | −1.5424 | 0.0588 | | |
| 10 | −1.7888 | 0.0724 | 1.6338 | 58.9 |
| 11 | −20.8276 | 0.0041 | | |
| 12 | −76.4228 | 0.3035 | 1.6411 | 34.2 |
| 13 | −1.0117 | 0.0041 | | |
| 14 | −382.3946 | 0.3824 | 1.5368 | 63.6 |
| 15 | −1.1065 | 0.0041 | | |
| 16 | −1.3386 | 0.1038 | 1.8467 | 23.9 |
| 17 | 4.5533 | 0.4066 | 1.6285 | 60.1 |
| 18 | −1.5795 | Variable | | |
| 19 | ∞ | 0.0413 | 1.4902 | 57.8 |
| 20 | −1.7086 | 0.2067 | | |
| 21 | ∞ | 0.0620 | 1.5163 | 64.1 |
| 22 | ∞ | | | |

| Face | D (12×) | D (15×) |
|---|---|---|
| 6 | 0.6815 | 0.7155 |
| 18 | 2.2427 | 2.2196 |

TABLE 2

| Face | K | A | B | C | D |
|---|---|---|---|---|---|
| 1 | 1.0000 | $0.8017 \times 10^{-1}$ | $-0.2765 \times 10^{-1}$ | $0.5868 \times 10^{-2}$ | $-0.3679 \times 10^{-3}$ |
| 2 | 1.0000 | $0.7947 \times 10^{-1}$ | $0.7336 \times 10^{-2}$ | $-0.3549 \times 10^{-1}$ | $0.1378 \times 10^{-1}$ |
| 5 | 1.0000 | $-0.3382 \times 10^{-1}$ | $0.5365 \times 10^{-2}$ | $-0.2235 \times 10^{-1}$ | $0.4393 \times 10^{-1}$ |
| 6 | 1.0000 | $-0.1089 \times 10^{-1}$ | $0.4016 \times 10^{-2}$ | $0.8496 \times 10^{-2}$ | $-0.7780 \times 10^{-2}$ |
| 8 | 1.0000 | $0.3967 \times 10^{-1}$ | $-0.2292$ | $-0.5579 \times 10^{-1}$ | $-0.1381 \times 10^{-1}$ |
| 9 | 1.0000 | 0.4012 | 0.1848 | $-0.3030 \times 10^{-1}$ | $-0.3589 \times 10^{-1}$ |
| 20 | −6.3426 | $-0.3700 \times 10^{-1}$ | 0.0 | 0.0 | 0.0 |

TABLE 3

| Face | R | D | $N_d$ | $\nu_d$ |
|---|---|---|---|---|
| 1 | 5.0077 | 0.2420 | 1.4902 | 57.8 |
| 2 | 1.3495 | 1.1381 | | |
| 3 | 15.5050 | 0.1311 | 1.5163 | 64.1 |
| 4 | 1.6147 | 1.2971 | | |
| 5 | 2.6615 | 0.1916 | 1.5836 | 30.3 |
| 6 | 28.4349 | Variable | | |
| 7 | ∞ | 0.1477 | | |
| 8 | −1.2320 | 0.0877 | 1.4910 | 57.6 |
| 9 | −1.5055 | 0.0599 | | |
| 10 | −1.6445 | 0.0706 | 1.6227 | 60.3 |
| 11 | −36.3769 | 0.0040 | | |
| 12 | 69.6913 | 0.2876 | 1.6477 | 33.7 |
| 13 | −0.9981 | 0.0041 | | |
| 14 | 181.1857 | 0.3608 | 1.4900 | 63.9 |
| 15 | −1.0563 | 0.0040 | | |
| 16 | −1.2864 | 0.1008 | 1.8467 | 23.9 |
| 17 | 4.8851 | 0.3866 | 1.5808 | 61.9 |
| 18 | −1.4180 | Variable | | |
| 19 | ∞ | 0.0403 | 1.4902 | 57.8 |
| 20 | −1.7569 | 0.2016 | | |
| 21 | ∞ | 0.0605 | 1.5163 | 64.1 |
| 22 | ∞ | | | |

| Face | D (12×) | D (15×) |
|---|---|---|
| 6 | 0.6884 | 0.7237 |
| 18 | 2.4801 | 2.4514 |

TABLE 4

| Face | K | A | B | C | D |
|---|---|---|---|---|---|
| 1 | 1.0000 | $0.8075 \times 10^{-1}$ | $-0.3247 \times 10^{-1}$ | $0.7817 \times 10^{-2}$ | $-0.5302 \times 10^{-3}$ |
| 2 | 1.0000 | $0.7457 \times 10^{-1}$ | $0.4371 \times 10^{-2}$ | $-0.4559 \times 10^{-1}$ | $0.1934 \times 10^{-1}$ |
| 5 | 1.0000 | $-0.2930 \times 10^{-1}$ | $0.1376 \times 10^{-1}$ | $-0.2674 \times 10^{-1}$ | $0.5474 \times 10^{-1}$ |
| 6 | 1.0000 | $-0.1074 \times 10^{-1}$ | $-0.3023 \times 10^{-2}$ | $0.1390 \times 10^{-1}$ | $0.1245 \times 10^{-1}$ |
| 8 | 1.0000 | $0.5086 \times 10^{-1}$ | −0.2550 | $-0.6525 \times 10^{-1}$ | $-0.1610 \times 10^{-1}$ |
| 9 | 1.0000 | 0.4257 | 0.2074 | $-0.3469 \times 10^{-1}$ | $-0.4368 \times 10^{-1}$ |
| 20 | −6.3445 | $-0.3866 \times 10^{-1}$ | 0.0 | 0.0 | 0.0 |

TABLE 5

| Face | R | D | $N_d$ | $\nu_d$ |
|---|---|---|---|---|
| 1 | 2.8283 | 0.2225 | 1.4902 | 57.8 |
| 2 | 0.9936 | 0.6604 | | |
| 3 | 1.7580 | 0.1205 | 1.6315 | 57.2 |
| 4 | 0.7648 | 0.8367 | | |
| 5 | 3.6034 | 0.1761 | 1.5836 | 30.3 |
| 6 | −3.1815 | Variable | | |
| 7 | ∞ | 0.4942 | | |
| 8 | −1.4393 | 0.0806 | 1.4910 | 57.6 |
| 9 | −1.4916 | 0.0343 | | |
| 10 | 19.3166 | 0.3522 | 1.5068 | 64.7 |
| 11 | −1.0307 | 0.0037 | | |
| 12 | −3.5565 | 0.0927 | 1.8467 | 23.9 |
| 13 | 2.4840 | 0.0065 | | |
| 14 | 2.4532 | 0.4037 | 1.5824 | 61.8 |
| 15 | −1.5715 | Variable | | |
| 16 | ∞ | 0.0371 | 1.4902 | 57.8 |
| 17 | −1.8232 | 0.1854 | | |
| 18 | ∞ | 0.0556 | 1.5163 | 64.1 |
| 19 | ∞ | | | |

TABLE 5-continued

| Face | D (12x) | D (15x) |
|------|---------|---------|
| 6    | 0.2347  | 0.2499  |
| 15   | 2.0114  | 1.9796  |

TABLE 6

| Face | K       | A                       | B                       | C                       | D                       |
|------|---------|-------------------------|-------------------------|-------------------------|-------------------------|
| 1    | 1.0000  | 0.2041                  | $-0.9255 \times 10^{-1}$ | $0.3633 \times 10^{-1}$ | $-0.5818 \times 10^{-2}$ |
| 2    | 1.0000  | 0.2495                  | $0.3374 \times 10^{-1}$  | $-0.3123 \times 10^{-1}$ | $0.8090 \times 10^{-1}$  |
| 5    | 1.0000  | $-0.1799 \times 10^{-1}$ | $-0.7938 \times 10^{-2}$ | $-0.5907 \times 10^{-2}$ | $0.7692 \times 10^{-1}$  |
| 6    | 1.0000  | $-0.7556 \times 10^{-1}$ | $-0.4197 \times 10^{-1}$ | $0.7270 \times 10^{-1}$  | $-0.4669 \times 10^{-3}$ |
| 8    | 1.0000  | $-0.6891 \times 10^{-1}$ | $-0.9761 \times 10^{-1}$ | $-0.1095$               | $-0.7635 \times 10^{-1}$ |
| 9    | 1.0000  | 0.2417                  | 0.15567                 | $-0.6534 \times 10^{-1}$ | $-0.8228 \times 10^{-1}$ |
| 17   | $-6.8492$ | $-0.4112 \times 10^{-1}$ | 0.0                     | 0.0                     | 0.0                     |

TABLE 7

| Face | R        | D        | $N_d$   | $\nu_d$ |
|------|----------|----------|---------|---------|
| 1    | 2.1030   | 0.1952   | 1.4902  | 57.8    |
| 2    | 0.8768   | 0.5236   |         |         |
| 3    | 1.3702   | 0.1115   | 1.6669  | 48.9    |
| 4    | 0.7297   | 0.7738   |         |         |
| 5    | 6.5647   | 0.1766   | 1.5836  | 30.3    |
| 6    | $-2.3802$ | Variable |         |         |
| 7    | ∞        | 0.5931   |         |         |
| 8    | $-1.5977$ | 0.0809   | 1.4910  | 57.6    |
| 9    | $-1.4856$ | 0.0038   |         |         |
| 10   | $-66.9223$ | 0.3625 | 1.6236  | 60.2    |
| 11   | $-1.0789$ | 0.0037   |         |         |
| 12   | $-2.4235$ | 0.0929   | 1.8467  | 23.9    |
| 13   | 3.0920   | 0.0037   |         |         |
| 14   | 2.9613   | 0.4333   | 1.6284  | 60.1    |
| 15   | $-1.5784$ | Variable |         |         |
| 16   | ∞        | 0.0372   | 1.4902  | 57.8    |
| 17   | $-2.0425$ | 0.1859   |         |         |
| 18   | ∞        | 0.0558   | 1.5163  | 64.1    |
| 19   | ∞        |          |         |         |

| Face | D (12x) | D (15x) |
|------|---------|---------|
| 6    | 0.2070  | 0.2239  |
| 15   | 1.8359  | 1.8171  |

TABLE 8

| Face | K        | A                       | B                        | C                        | D                        |
|------|----------|-------------------------|--------------------------|--------------------------|--------------------------|
| 1    | 1.0000   | 0.2402                  | $-0.1125$                | $0.5244 \times 10^{-1}$  | $-0.8243 \times 10^{-2}$ |
| 2    | 1.0000   | 0.2956                  | $0.5078 \times 10^{-2}$  | $0.1067 \times 10^{-1}$  | 0.1088                   |
| 5    | 1.0000   | $-0.4879 \times 10^{-1}$ | $-0.7411 \times 10^{-1}$ | $-0.1287 \times 10^{-1}$ | $0.8480 \times 10^{-1}$  |
| 6    | 1.0000   | $-0.1178$               | $-0.9447 \times 10^{-1}$ | $-0.1152$                | $-0.6210 \times 10^{-2}$ |
| 8    | 1.0000   | $-0.1665$               | $-0.5786 \times 10^{-1}$ | $-0.1031$                | $-0.7671 \times 10^{-1}$ |
| 9    | 1.0000   | 0.1515                  | 0.1975                   | $-0.3521 \times 10^{-1}$ | $-0.5718 \times 10^{-1}$ |
| 17   | $-6.9807$ | $-0.3372 \times 10^{-1}$ | 0.0                      | 0.0                      | 0.0                      |

What is claimed is:

1. A wide-angle lens comprising, successively from an enlargement side, a first lens group having a negative refracting power, a second lens group having a positive refracting power, and a third lens group having a Fresnel lens having a positive refracting power;

wherein said first lens group comprises, successively from the enlargement side, a first lens made of a plastic aspherical lens having a negative refracting power with a concave face directed onto a reduction side, a second lens having a negative refracting power with a concave face directed onto the reduction side, and a third lens made of a plastic aspherical lens having a positive refracting power; and wherein the following conditional expressions (1) and (2) are satisfied:

$$-7.5 < F_1/F < -3.0 \tag{1}$$

$$-1.8 < f_A/f_B < -0.5 \tag{2}$$

where $F_1$ is the focal length of the first lens group;

F is the focal length of the whole lens system;

$f_A$ is the focal length of the first lens in the first lens group; and $f_B$ is the focal length of the third lens in the first lens group.

2. A wide-angle lens according to claim 1, wherein said second lens group comprises a plastic aspherical lens disposed closest to the enlargement side therein, and wherein the following conditional expression (3) is satisfied:

$$|F/f_C| < 0.2 \tag{3}$$

where $f_C$ is the focal length of the plastic aspherical lens closest to the enlargement side in the second lens group.

3. A wide-angle lens according to claim 1, wherein, when changing magnification, focusing is carried out such that, while the Fresnel lens in said third lens group is fixed, the distance between said first and second lens groups and the distance between said second and third lens groups are changed.

* * * * *